US012220887B2

(12) United States Patent
Lorenz et al.

(10) Patent No.: US 12,220,887 B2
(45) Date of Patent: Feb. 11, 2025

(54) CURING MOLD ASSEMBLIES FOR NON-PNEUMATIC TIRES AS WELL AS METHODS OF MANUFACTURE

(71) Applicant: Bridgestone Americas Tire Operations, LLC, Nashville, TN (US)

(72) Inventors: Zachary G. Lorenz, Nashville, TN (US); Steven J. Jenkins, Nashville, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 18/559,980

(22) PCT Filed: Jun. 17, 2022

(86) PCT No.: PCT/US2022/072999
§ 371 (c)(1),
(2) Date: Nov. 9, 2023

(87) PCT Pub. No.: WO2022/266663
PCT Pub. Date: Dec. 22, 2022

(65) Prior Publication Data
US 2024/0262062 A1 Aug. 8, 2024

Related U.S. Application Data

(60) Provisional application No. 63/212,200, filed on Jun. 18, 2021.

(51) Int. Cl.
*B29D 30/02* (2006.01)
(52) U.S. Cl.
CPC .................................. *B29D 30/02* (2013.01)
(58) Field of Classification Search
CPC ......... B29C 33/00; B29C 33/04; B29C 33/02; B29D 30/02; B29D 30/0629; B29D 30/10;
(Continued)

(56) References Cited

U.S. PATENT DOCUMENTS

2014/0034219 A1 2/2014 Chadwick et al.
2014/0070448 A1 3/2014 Martin et al.
(Continued)

FOREIGN PATENT DOCUMENTS

WO WO-2017131742 A1 8/2017

OTHER PUBLICATIONS

International Search Report and Written Opinion dated Oct. 19, 2022 issued by KIPO in connection with corresponding International Application No. PCT/US2022/072999.

*Primary Examiner* — Cedrick S Williams
(74) *Attorney, Agent, or Firm* — Shaun J. Fox; Matthew P. Dugan

(57) ABSTRACT

Mold assemblies used for curing non-pneumatic tires include a mold section and curing shoe assemblies supported on the mold section. The curing shoe assemblies include a first actuation member supported on the mold section in radially-offset alignment with a mold axis. A second actuation member is supported for axial displacement relative to the first actuation member. First and second curing shoes are spaced laterally from the first and second actuation members. The first and second curing shoes are operatively connected to the first and second actuation members such that movement of the first and second actuation members toward one another displaces the first and second curing shoes laterally away from one another. In some cases, movement of the first and second actuation members away from one another displaces the first and second curing shoes laterally toward one another. Methods of manufacturing a non-pneumatic tire are also included.

20 Claims, 12 Drawing Sheets

(58) Field of Classification Search
CPC .............. B29D 30/12; B29D 2030/063; B29D 2030/0631; B29D 2030/0661; B29D 2030/105
See application file for complete search history.

(56) References Cited

U.S. PATENT DOCUMENTS

| | | |
|---|---|---|
| 2015/0210025 A1 | 7/2015 | Martin |
| 2016/0176136 A1* | 6/2016 | Yang .................. B29D 30/0605 264/403 |
| 2019/0001745 A1* | 1/2019 | Delfino .................... B60C 7/14 |
| 2021/0154958 A1 | 5/2021 | Sportelli et al. |

* cited by examiner

CURING MOLD ASSEMBLIES FOR NON-PNEUMATIC TIRES AS WELL AS METHODS OF MANUFACTURE

This application is the National Stage of International Application No. PCT/US2022/072999, filed on Jun. 17, 2022, which claims the benefit of priority from U.S. Provisional Patent Application No. 63/212,200, filed on Jun. 18, 2021, the entire contents of which is hereby incorporated herein by reference.

BACKGROUND

The subject matter of the present disclosure broadly relates to the art of vehicle tire manufacturing and, more particularly, to mold assemblies for curing non-pneumatic tires as well as methods of manufacturing non-pneumatic tires using such mold assemblies.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary.

Conventional pneumatic tires include a tire casing with a tread formed on or along the exterior thereof that is configured to engage a roadway or other ground surface. The tire casing includes an annular body formed from a plurality of layers or plies (e.g., radial plies, belt plies) with opposing sidewalls that extend radially inward from along shoulder portions of the annular body to beads forming the radially-inward extent of the sidewalls. The inner surface of the annular body and the opposing sidewalls are covered by an inner liner that defines the tire chamber of a pneumatic tire.

In conventional tire manufacturing processes, an uncured tire carcass and tread assembly is loaded into a mold assembly on a tire curing press. The mold assembly includes a plurality of die segments with an inside surface portion that includes a section of a tread pattern. The mold assembly is closed by the tire curing press, which positions the die segments in abutting engagement with the tread material of the uncured tire assembly. The tire curing press also includes a curing bladder that is positioned inside the mold assembly such that the uncured tire assembly is spaced outward of the curing bladder in an uninflated condition of the curing bladder. During the curing process, the curing bladder is inflated such that the curing bladder extends into the tire chamber of the uncured tire assembly in abutting engagement with the inner liner. While under pressure from the mold assembly and the inflated curing bladder, the tire curing press introduces heat to the uncured tire assembly which vulcanizes or otherwise crosslinks the uncured tire material to form a completed tire.

Notwithstanding the wide usage and overall success of known types and kinds of tire mold assemblies and methods of manufacture, it has been recognized that certain disadvantages exist with known processes that could limit the applicability and/or use thereof in connection with the manufacture of tire assemblies having other structural arrangements, such as so-called non-pneumatic tires, for example. Accordingly, it is believed desirable to develop mold assemblies and methods of manufacture that may aid in overcoming the foregoing and/or other problems and/or disadvantages of known techniques, and/or otherwise advance the manufacture of non-pneumatic tires.

BRIEF DESCRIPTION

One example of a method of manufacturing a non-pneumatic tire in accordance with the subject matter of the present disclosure can include supporting a curing shoe assembly on a first mold section that has a longitudinal-extending mold axis. The curing shoe assembly can include a first actuation member supported on the first mold section such that the first actuation member is disposed in radially-offset alignment with the mold axis. A second actuation member can be supported in coaxial relation to the first actuation member and for axial displacement relative thereto. A first curing shoe can be spaced laterally from the first and second actuation members, and a second curing shoe can be spaced laterally from the first and second actuation members in a direction opposite the first curing shoe. The first and second curing shoes can be operatively connected to the first and second actuation members such that: 1) movement of the first and second actuation members relative to one another in a first axial direction displaces the first and second curing shoes laterally away from one another; and, 2) such that movement of the first and second actuation members relative to one another in a second axial direction opposite the first axial direction displaces the first and second curing shoes laterally toward one another. The method can also include providing a less-than-fully-cured non-pneumatic tire assembly that includes a plurality of support structures disposed in peripherally-spaced relation to one another and a plurality of spaces disposed in peripherally-spaced relation to one another with one of the plurality of spaces between adjacent ones of the plurality of support structures. The method can further include positioning the less-than-fully-cured non-pneumatic tire assembly along the first mold section such that the curing shoe assembly is disposed within one of the plurality of spaces and axially coextensive with the less-than-fully-cured non-pneumatic tire assembly. The method can also include displacing the first and second actuation members relative to one another in the first axial direction thereby displacing the first and second curing shoes away laterally away from one another into engagement with and applying pressure to the less-than-fully-cured non-pneumatic tire assembly. The method can further include curing the non-pneumatic tire assembly.

One example of a mold assembly in accordance with the subject matter of the present disclosure, such as may be used for curing non-pneumatic tires, can include a first mold section having a longitudinally-extending mold axis and a curing shoe assembly supported on the first mold section. The curing shoe assembly can include a first actuation member supported on the first mold section such that the first actuation member is disposed in radially-offset alignment with the mold axis. A second actuation member can be supported in coaxial relation to the first actuation member and for axial displacement relative thereto. A first curing shoe can be spaced laterally from the first and second actuation members, and a second curing shoe spaced laterally from the first and second actuation members in a direction opposite the first curing shoe. The first and second curing shoes can be operatively connected to the first and second actuation members such that movement of the first and second actuation members relative to one another in a first axial direction displaces the first and second curing shoes laterally away from one another. Additionally, in some cases, movement of the first and second actuation members relative to one another in a second axial direction opposite the first axial direction can displace the first and second curing shoes laterally toward one another.

DETAILED DESCRIPTION

Turning now to the drawings, it is to be understood that the showings are for purposes of illustrating examples of the subject matter of the present disclosure and that the same are not intended to be limiting. Additionally, it will be appreciated that the drawings are not to scale and that portions of certain features and/or elements may be exaggerated for purpose of clarity and/or ease of understanding.

Figure 1:
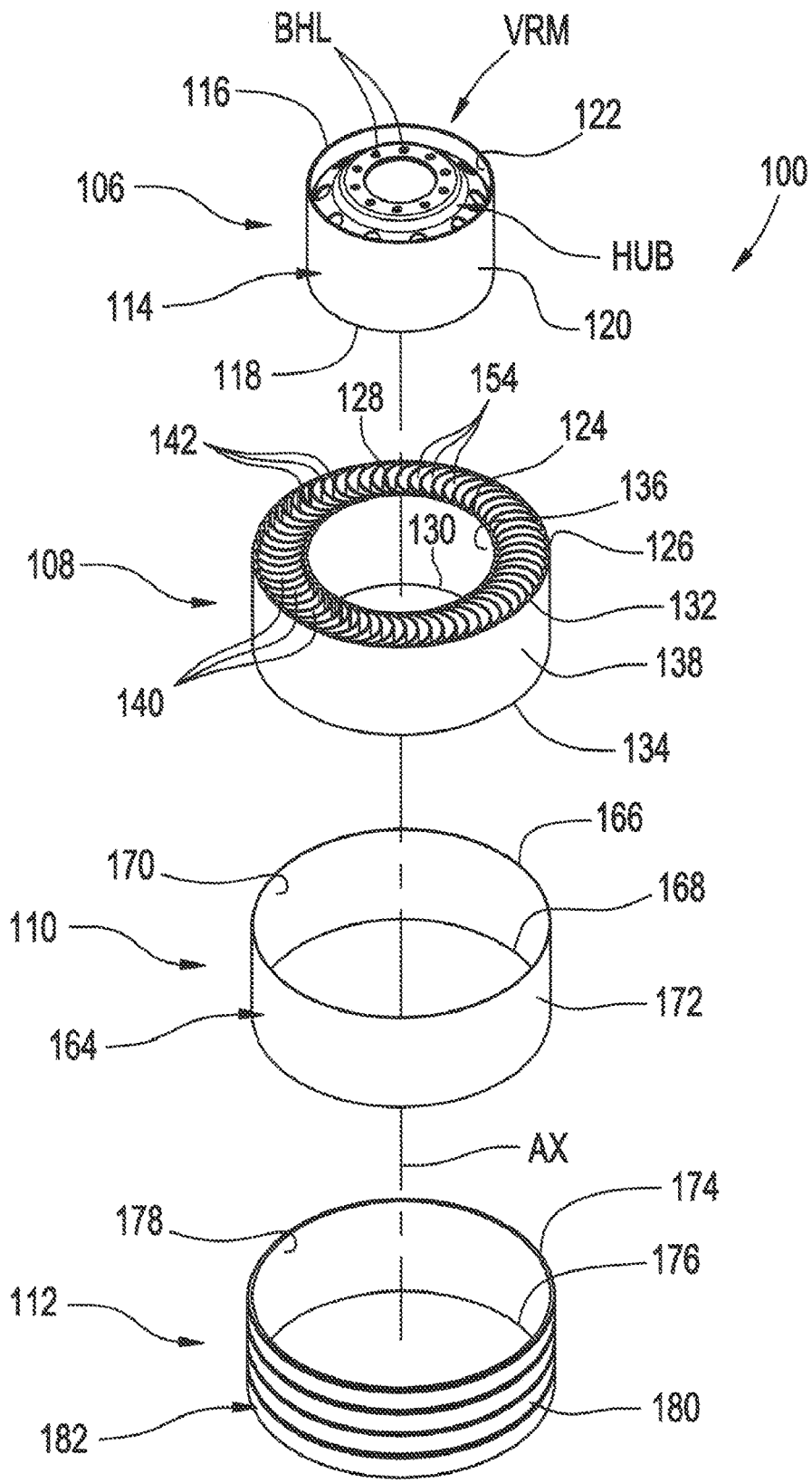
FIG. 1 is an exploded top perspective view of components of an exemplary less-than-fully-cured non-pneumatic tire shown prior to assembly.
Figure 2:
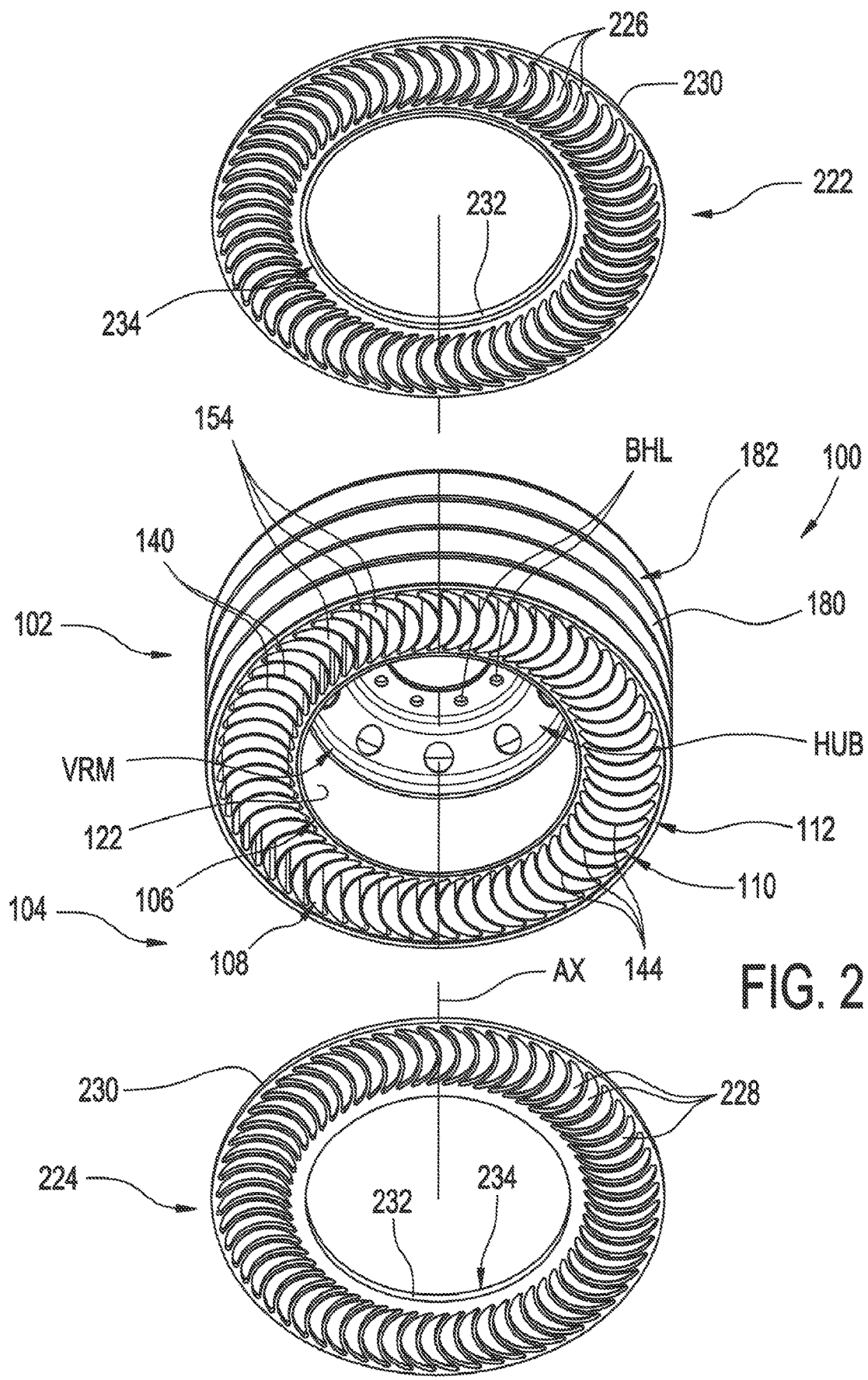
FIG. 2 is a bottom perspective view of the exemplary less-than-fully-cured non-pneumatic tire in an assembled condition and prepared for curing.

FIGS. 1 and 2 illustrates one example of a less-than-fully-cured non-pneumatic tire dimensioned and/or otherwise configured for curing in a mold assembly in accordance with the subject matter of the present disclosure and/or by way of a method of manufacture in accordance with the subject matter of the present disclosure. It will be appreciated that non-pneumatic tires of various of types, kinds and/or constructions have been developed and/or used in different applications and/or environments. As one non-limiting example, less-than-fully-cured non-pneumatic tire (or tire assembly) 100 is shown in FIGS. 1-7 as having a longitudinal axis AX and can extend axially from an end 102 to an end 104 that is opposite end 102. Less-than-fully-cured non-pneumatic tire 100 can include an annular ring 106 that extends peripherally about axis AX and a structure body 108 that is disposed outwardly of at least a portion of annular ring 106 and also extends peripherally about axis AX. Less-than-fully-cured non-pneumatic tire 100 can also include an annular ring 110 that extends peripherally around axis AX with at least a portion of annular ring 110 disposed outwardly of annular ring 106 and/or structure body 108. Less-than-fully-cured non-pneumatic tire 100 can further include a tread body 112 extending peripherally around axis AX with at least a portion of tread body 112 disposed outwardly of annular ring 110.

It will be appreciated that mold assemblies and methods of manufacture in accordance with the subject matter of the present disclosure are used to transition a non-pneumatic tire having one or more portions formed from a less-than-fully-cured elastomeric material into a non-pneumatic tire in which all or substantially all portions thereof are substantially-entirely cross-linked, vulcanized and/or otherwise cured. As such, it will be appreciated and understood that any one or more of the foregoing components of non-pneumatic tire 100 can include elastomeric material to be transitioned from a less-than-fully-cured condition to at least a substantially-entirely cured condition, and that arrangements of non-pneumatic tire 100 that are shown and described herein are merely exemplary and not intended to be limiting.

It will be appreciated that annular ring 106 can be of any suitable size, shape and/or configuration, and can include any suitable number of one or more walls and/or wall portions. As one non-limiting example, the annular ring could be a part of or otherwise at least partially form an outer wall or outer wall portion of a vehicle wheel or rim, such as is represented in FIGS. 1 and 2 by reference characters VRM. In such an exemplary arrangement, annular ring 106 can include a ring wall (or ring wall portion) 114 extending peripherally around longitudinal axis AX. Optionally, annular ring 106 can include a hub wall (or hub wall portion) HUB disposed inwardly of ring wall portion 114. If included, hub wall portion HUB can be operatively connected to ring wall portion 114. Additionally, if included, hub wall portion HUB can, optionally, be dimensioned and/or otherwise adapted for mounting in a conventional manner on or along an associated component or device, such as an axle of an associated vehicle by way of bolt holes BHL, for example.

Ring wall portion 114 of annular ring 106 can extend axially between a ring edge 116 disposed toward end 102 and a ring edge 118 that is disposed toward end 104 in axially-spaced relation to ring edge 116. Ring wall portion 114 can include an outer surface portion 120 that faces radially outward and extends peripherally about longitudinal axis AX and axially between ends 102 and 104. In some cases, ring wall portion 114 can, optionally, include an inner surface portion 122 that extends peripherally about longitudinal axis AX and faces radially inward axially along and/or between end 102 and/or end 104.

Structure body 108 can include an inner wrap or layer 124 and an outer wrap or layer 126 disposed radially outward of inner layer 124. Inner and outer layers 124 and 126 extend axially between ends 102 and 104 with inner layer 124 extending axially between edges 128 and 130 and outer layer 126 extending axially between edges 132 and 134. In some cases, inner and outer layers 124 and 126 can be substantially coextensive with one another such that edges 128 and 132 are at least approximately aligned with one another along end 102 and edges 130 and 134 are at least approximately aligned with one another along end 104.

Inner layer 124 can at least partially define an inside surface portion 136 of structure body 108 that extends peripherally around longitudinal axis AX and axially between ends 102 and 104. Outer layer 126 can at least partially define an outer surface portion 138 of structure body 108 that extends peripherally around longitudinal axis AX and axially between ends 102 and 104.

Structure body 108 also includes a plurality of support structures 140 that extend between and operatively interconnect inner and outer layers 124 and 126. It will be appreciated that support structures 140 can be of any suitable shape, configuration and/or arrangement, and can be operatively connected to inner and outer layers 124 and 126 in any suitable manner. As one non-limiting example, support structures 140 can extend axially from an edge 142 disposed toward end 102 to an edge 144 disposed toward end 104. Support structures 140 can also include an end 146 disposed toward inner layer 124 and an end 148 disposed toward outer layer 126 in spaced relation to end 146. Support structures 140 are shown and described herein as having a curved or otherwise non-linear profile along a plane taken transverse to longitudinal axis AX. Support structures 140 are shown and described as having a concave surface portion 150 facing one circumferential direction about longitudinal axis AX and a convex surface portion 152 facing the opposite circumferential direction. It will be appreciated, however, that such configurations are merely exemplary and that support structures with other shapes and/or profiles could alternately be used without departing from the subject matter of the present disclosure.

Support structures 140 are disposed in peripherally-spaced relation to one another around longitudinal axis AX such that a plurality of spaces 154 are also disposed in peripherally-spaced relation to one another around the longitudinal axis with one of spaces 154 disposed between adjacent ones of support structures 140. In such an arrangement, spaces 154 can have an arcuate, curved or otherwise approximately crescent-shaped cross-sectional profile or configuration with concave surface portion 150 of one support structure 140 and convex surface portion 152 of an adjacent support structure 140 at least partially defining peripherally-spaced sides of spaces 154. In some cases, support structures 140 can extend into or otherwise be at least partially embedded within inner layer 124 and/or outer layer 126. In such cases, a portion 156 of inner layer 124 can at least partially define an end surface portion 158 of spaces 154, such as may have a curved or otherwise non-linear cross-sectional shape and/or configuration. Additionally, or in the alternative, a portion 160 of outer layer 126 can at least partially define an end surface portion 162 of spaces 154, such as may have a curved or otherwise nonlinear cross-sectional shape and/or configuration.

It will be appreciated that annular ring 110 can be of any suitable size, shape and/or configuration, and can include any suitable number of one or more walls and/or wall portions. As one non-limiting example, annular ring 110 can include a ring wall (or ring wall portion) 164 extending peripherally around longitudinal axis AX. Ring wall portion 164 can extend axially between a ring edge 166 disposed toward end 102 and a ring edge 168 that is disposed toward end 104 in axially-spaced relation to ring edge 166. Ring wall portion 164 can include an inner surface portion 170 that faces radially inward and extends peripherally about longitudinal axis AX and axially along and/or otherwise between ends 102 and 104. Ring wall portion 164 can also include an outer surface portion 172 that extends peripherally about longitudinal axis AX and faces radially outward axially along and/or between end 102 and/or end 104.

Tread body 112 can extend axially between ends 102 and 104 with a tread edge 174 disposed along end 102 and a tread edge 176 disposed along end 104. Tread body 112 can also include an inside surface portion 178 that faces radially inward and an outer surface portion 180 that faces radially outward. One or more tread structures 182 (e.g., grooves, ribs, lugs, sipes) can, optionally, be pre-formed on or otherwise extend into tread body 112 from along outer surface portion 180 of less-than-fully-cured non-pneumatic tire 100 with such tread structures adapted during the curing process to at least partially define a ground-engaging tread (or tread pattern) on the cured non-pneumatic tire.

As discussed above, one or more walls and/or wall portions of non-pneumatic tire 100 can be formed from an elastomeric material that is in a less-than-fully-cured condition such that at least these walls and/or wall portions are curable using a mold assembly and/or method of manufacture in accordance with the subject matter of the present disclosure. For example, tread body 112 can be at least partially formed from a less-than-fully-cured elastomeric material. Additionally, or in the alternative, one or more of inner layer 124 and/or outer layer 126 of structure body 108 can be at least partially formed from a less-than-fully-cured elastomeric material. As a further example, and/or as another alternative, support structures 140 can, optionally, include one or more layers of less-than-fully-cured elastomeric material. As non-limiting examples of such constructions, support structures 140 can, in some cases, be at least partially formed from sheets of comparatively-rigid material (e.g., metal, fiber-reinforced composite) of which ends 146 and 148 can, respectively, be at least partially embedded or otherwise disposed within inner and outer layers 124 and 126 of structure body 108. Additionally, or in the alternative, a layer of less-than-fully-cured elastomeric material can extend along and/or at least partially define concave surface portion 150 and/or convex surface portion 152. As another non-limiting example, support structures 140 can be at least partially formed from a plurality of comparatively-rigid wires and/or filaments arranged adjacent one another and at least partially embedded in a quantity of less-than-fully-cured elastomeric material to at least partially form a sheet-like structure.

It will be appreciated that less-than-fully-cured non-pneumatic tire 100 can include any suitable elastomeric material or combination of elastomeric materials, such as natural rubbers, synthetic rubbers and/or thermoplastic elastomers, for example. Additionally, it will be recognized and appreciated, in some cases, a variety of components can be formed from a common less-than-fully-cured elastomeric material. In other cases, however, less-than-fully-cured elastomeric materials of two or more compositions, compounds and/or grades can be used. Terms such as "less-than-fully-cured," and the like, as used herein refer to elastomeric materials having polymer chains that become cross-linked or otherwise bonded when subjected to heat, pressure and/or chemical compounds with "fully cured" or "substantially fully cured" elastomeric materials exhibiting substantially different material and/or mechanical properties than "less-than-fully-cured" elastomeric materials. One non-limiting example of a suitable curing process includes vulcanization of natural and synthetic rubber elastomers.

It will be appreciated that any combination of one or more less-than-fully-cured elastomeric materials can be used or otherwise included in a less-than-fully-cured non-pneumatic tire (e.g., non-pneumatic tire 100). As one non-limiting example, less-than-fully-cured non-pneumatic tire 100 can include one or more quantities of elastomeric material substantially all of each of which is in a "green" or substantially-entirely uncured condition. As another non-limiting example, less-than-fully-cured non-pneumatic tire 100 can include one or more quantities of elastomeric material that is/are in a "green" or substantially-entirely uncured condition and one or more quantities of elastomeric material that is/are in an at least partially cured condition. As a further non-limiting example, less-than-fully-cured non-pneumatic tire 100 can include one or more quantities of elastomeric material that is/are in a partially but not entirely cured condition. As such, it is to be recognized and appreciated that less-than-fully-cured non-pneumatic tire 100 can include, without limitation: one or more quantities of "green" or substantially-entirely uncured elastomeric material; or, one or more quantities of partially but not fully cured elastomeric material; or, both one or more quantities of "green" or substantially-entirely uncured elastomeric material and one or more quantities of partially but not fully cured elastomeric material.

Figure 3:
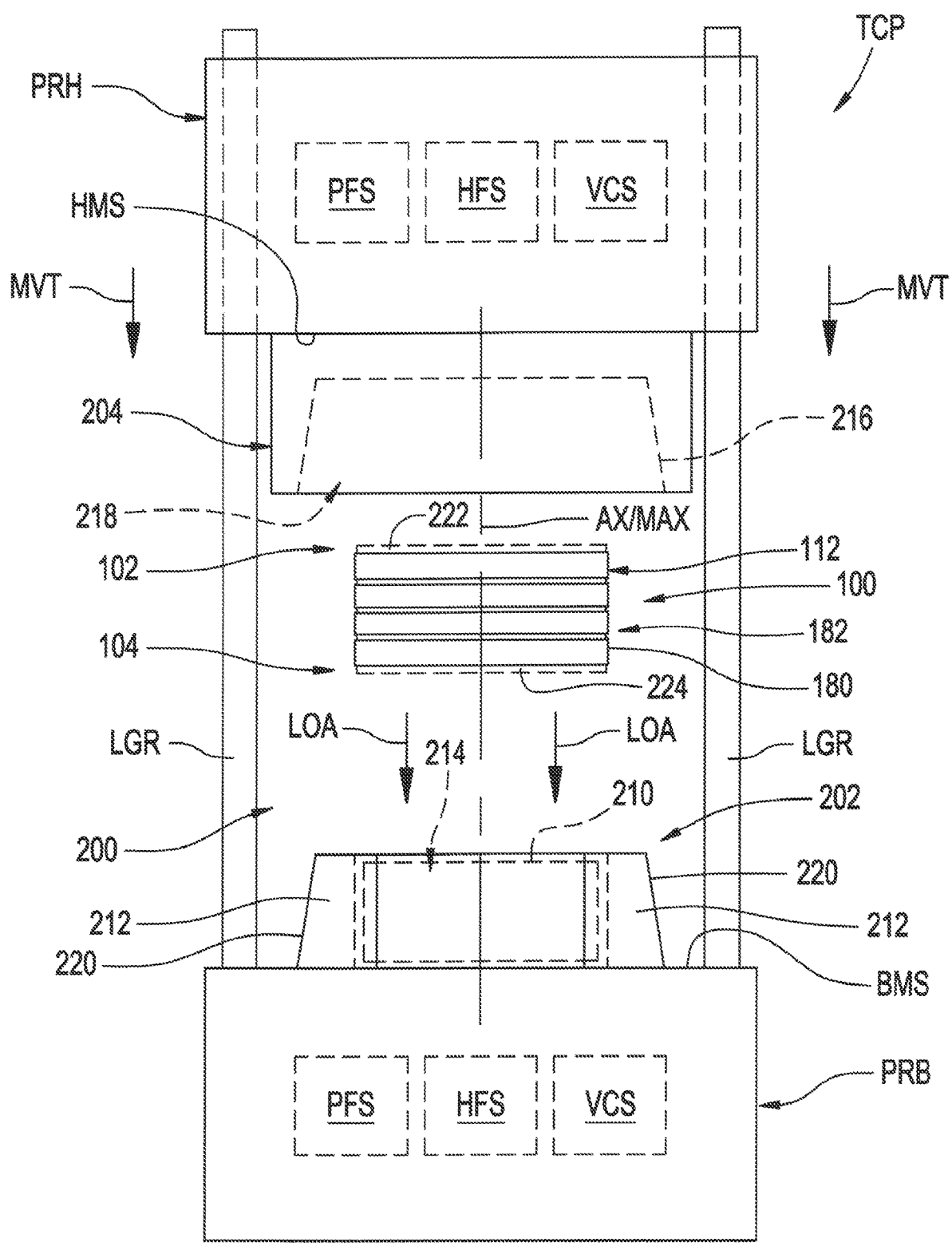
FIG. 3 is a front elevation view of a tire curing press shown with a mold assembly in an open condition and the exemplary less-than-fully-cured non-pneumatic tire being loaded.
Figure 4:
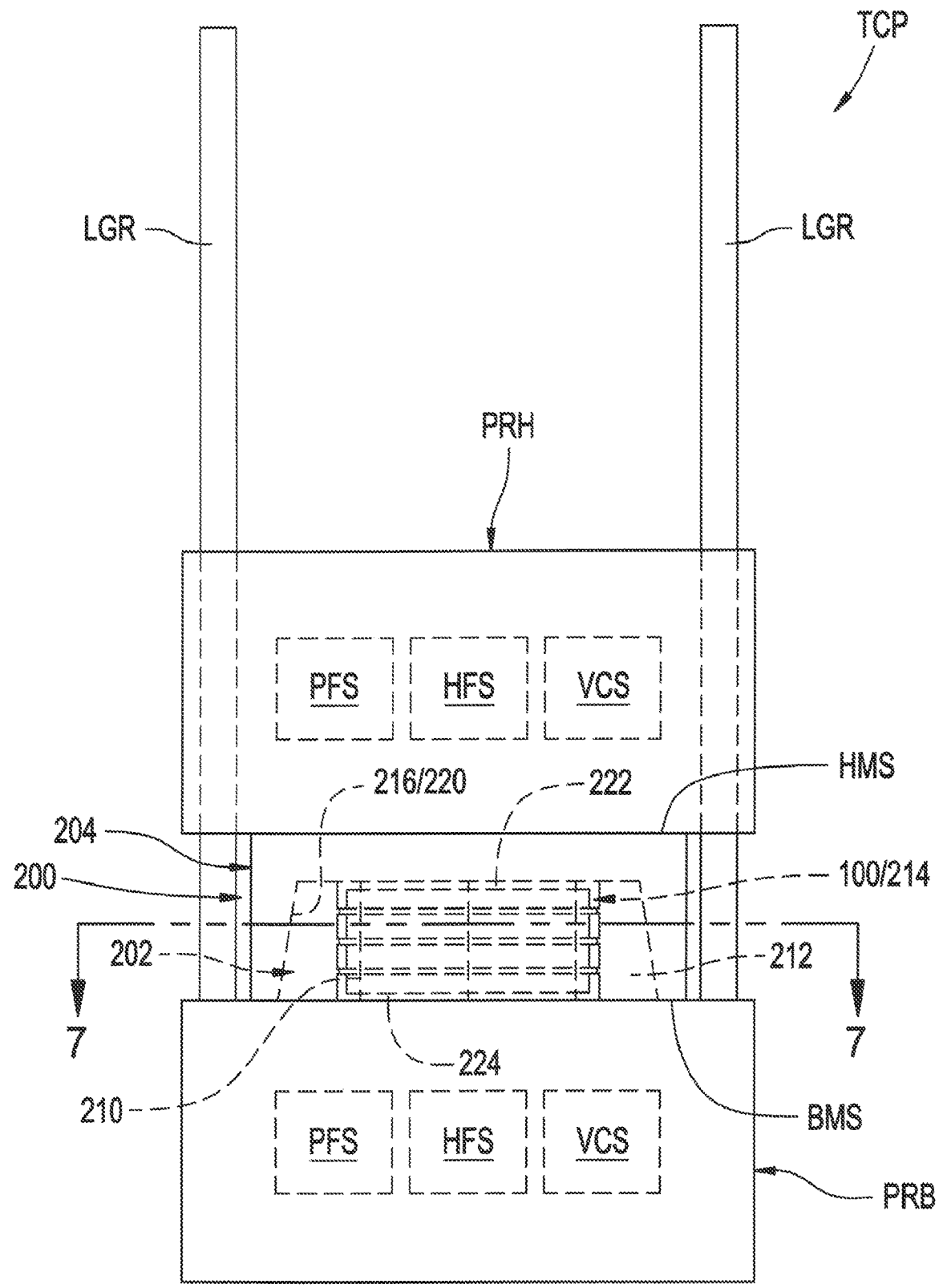
FIG. 4 is a front elevation view of the tire curing press of FIG. 3 shown with the mold assembly in a closed condition and the exemplary less-than-fully-cured non-pneumatic tire loaded for curing.
Figure 5:
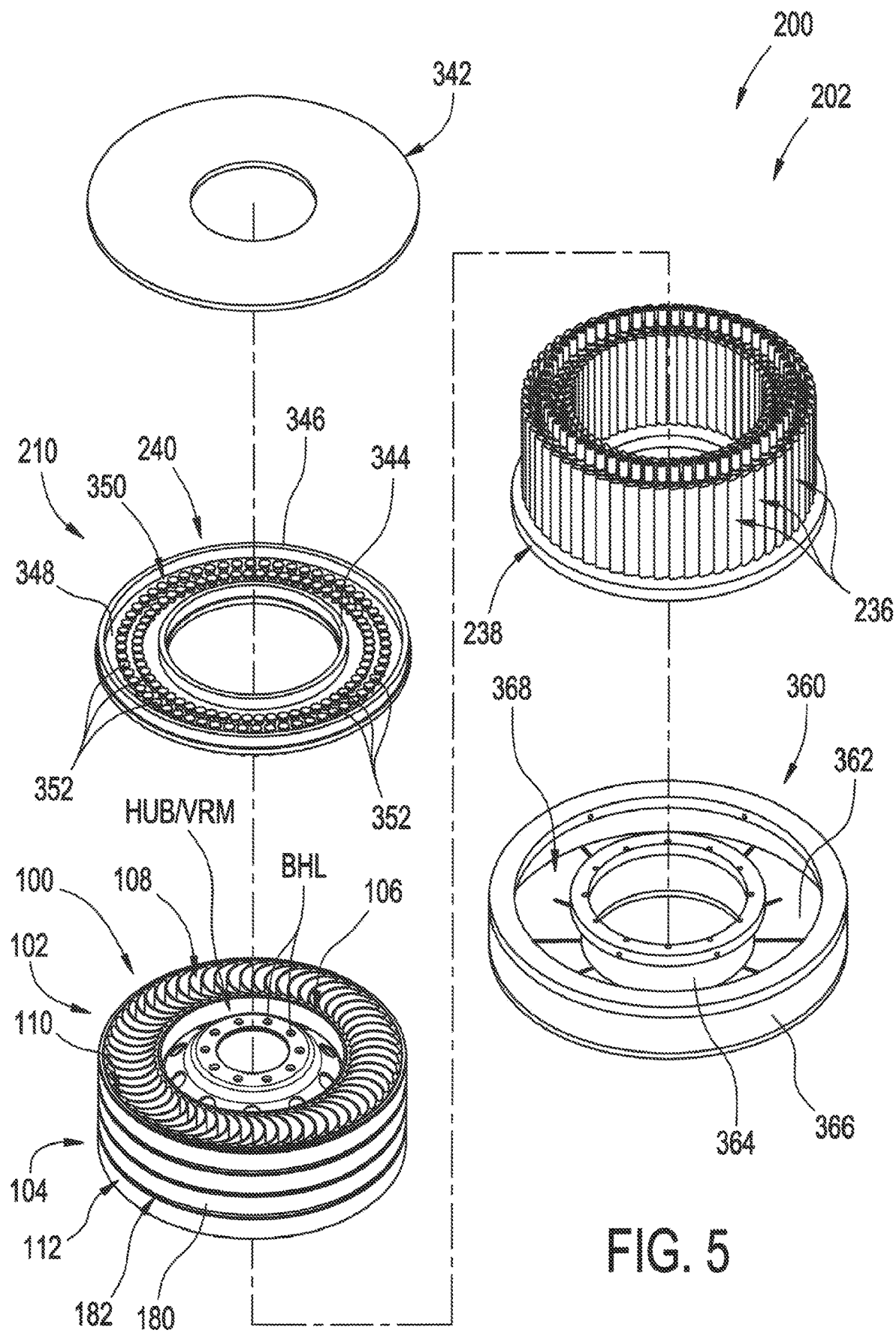
FIG. 5 is an exploded top perspective view of the mold assembly showing an exemplary interstitial curing system prior to loading of the exemplary less-than-fully-cured non-pneumatic tire.
Figure 6:
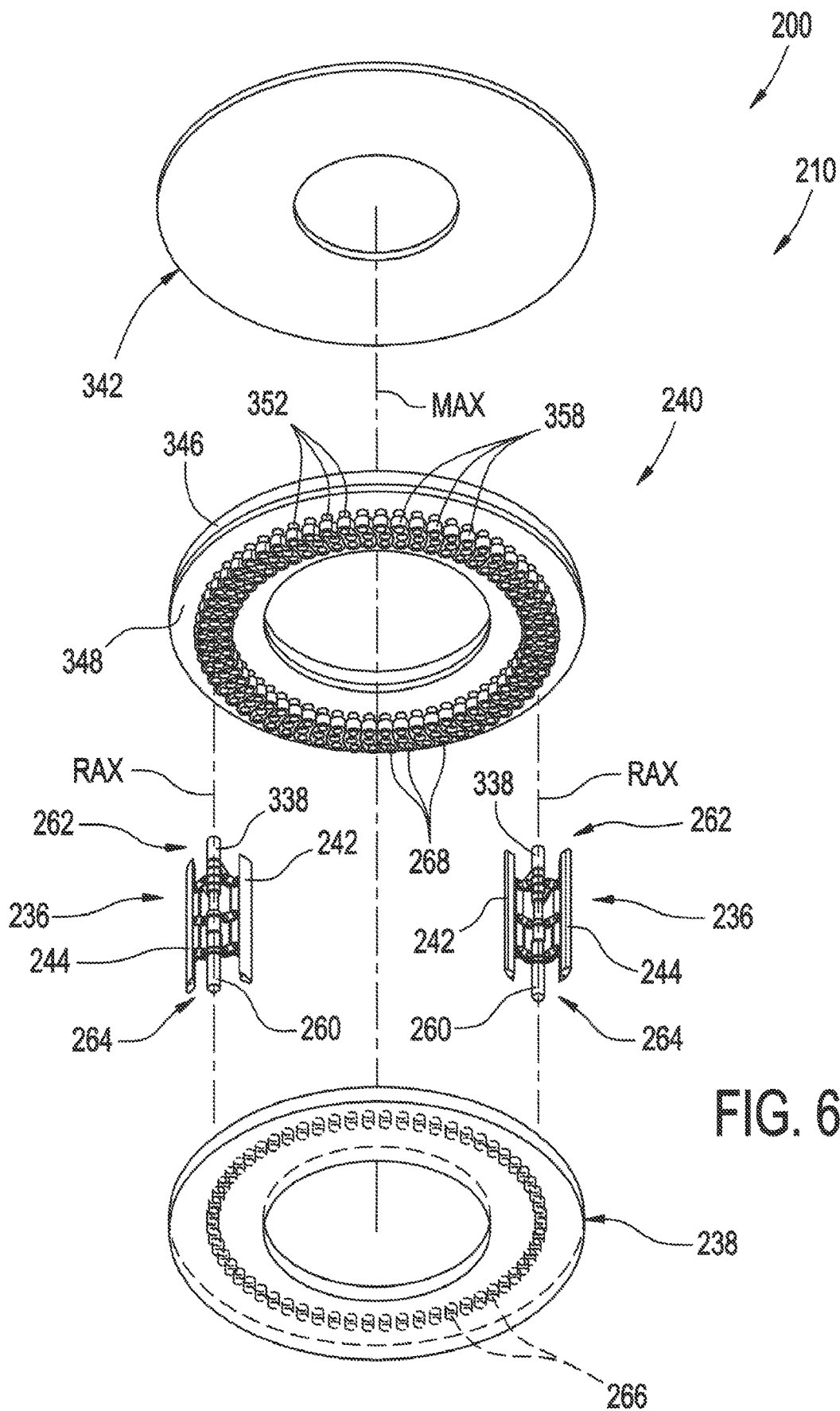
FIG. 6 is an exploded bottom perspective view of the exemplary interstitial curing system in FIG. 5.

FIGS. 3 and 4 schematically illustrate an otherwise conventional tire curing press TCP that includes a press base PRB with a base mounting surface BMS. Tire curing press TCP also includes a press head PRH with a head mounting surface HMS. Press head PRH is moveable relative to press base PRB, such as along linear guide rods LGR, for example, in a conventional manner. Press head PRH is shown in FIG. 3 as being disposed in a first or raised position that is moveable to a second or lowered position shown in FIG. 4, which movement is represented in FIG. 3 by arrows MVT. Tire curing press TCP can include one or more pressurized fluid sources, one or more heated fluid sources and/or one or more vacuum sources, such as are schematically represented in FIGS. 3 and 4 by dashed boxes PFS, HFS and VCS, respectively, and can be included on, along or be otherwise operatively associated with press base PRB and/or press head PRH, as is well known in the art.

A mold assembly 200 in accordance with the subject matter of the present disclosure is shown in FIGS. 3-9 as being operatively supported within or otherwise on or along tire curing press TCP. Mold assembly 200 includes a mold section 202 that is supported on or along base mounting surface BSM of press base PRB and a mold section 204 that is supported on or along head mounting surface HMS of press head PRH. Mold sections 202 and/or 204 can be operatively connected in fluid communication with pressurized fluid source PFS and/or vacuum source VCS in any manner suitable for transferring pressurized fluid to and/or from the mold sections, such as by way of one or more conduits or passages 206, for example. Additionally, or in the alternative, mold sections 202 and 204 can be operatively connected in fluid communication with heated fluid source HFS and/or vacuum source VCS in any manner suitable for transferring fluid (heated or otherwise) to and/or from the mold sections, such as by way of one or more conduits or passages 208, for example.

Mold assembly 200 includes a mold axis MAX extending in or otherwise along the direction of movement MVT of tire curing press TCP. As such, mold sections 202 and 204 are axially displaceable relative to one another during operation of the tire curing press with mold sections 202 and 204 shown spaced apart in FIG. 3 representing an open condition of the mold assembly and with mold sections 202 and 204 shown coextensively engaged with one another in FIG. 4 representing a closed condition of the mold assembly. Mold section 202 includes an interstitial curing system 210 and a plurality of tread die segments 212 that are disposed peripherally about interstitial curing system 210 to at least partially define a mold cavity 214 within mold section 202. Mold section 204 includes a surface portion 216 that at least partially defines a mold cavity 218 within the mold section. Mold cavity 218 is dimensioned to receive at least a portion of mold section 202 in a closed condition of the mold assembly. In some cases, an outer surface portion 220 of tread die segments 212 can abuttingly engage surface portion 216 of mold section 204 as the mold sections move toward the closed condition.

For example, with a less-than-fully-cured non-pneumatic tire 100 loaded into or otherwise positioned at least partially within mold cavity 214, as is represented in FIG. 3 by arrows LOA and shown in FIG. 4, tread die segments 212 are displaced radially inward into engagement with tread body 112 of less-than-fully-cured non-pneumatic tire 100. Such radial compression urges inside surface portion 178 of tread body 112 into engagement with outer surface portion 172 of annular ring 110. Additionally, such radial compression urges inner surface portion 170 of annular ring 110 into engagement with outer surface portion 138 of structure body 108. In some cases, such radial compression can also urge inside surface portion 136 of structure body 108 into engagement with outer surface portion 120 of annular ring 106. Furthermore, tread die segments 212 include features formed therealong generally opposite surface portion 220 that extend into engagement with tread body 112 from along outer surface portion 180 thereof under such radial compression to at least partially define ground-engaging tread pattern (e.g., grooves, ribs, lugs, sipes) on or along non-pneumatic tire 100.

As shown in FIGS. 2-4, in some cases, a support plate 222 can be disposed along end 102 of less-than-fully-cured non-pneumatic tire 100. Additionally, or in the alternative, a support plate 224 can be disposed along end 104 of less-than-fully-cured non-pneumatic tire 100. If included, support plate 222 and/or 224 can aid in maintaining annular ring 106, structure body 108, annular ring 110 and/or tread body 112 in a desired axial position relative to one another (e.g., approximate axial alignment), such as during transport to tire curing press TCP, loading/unloading of non-pneumatic tire 100 into and/or out of mold assembly 200 (or a mold section thereof), and/or to rotationally index or otherwise position support structures 140 and/or spaces 154 around longitudinal axis AX relative to interstitial curing system 210 and/or other features of mold assembly 200. If included, support plates 222 and/or 224 can include a plurality of openings 226 and 228, respectively, that have a shape, configuration and/or arrangement complementary to support structures 140 and/or spaces 154 of less-than-fully-cured non-pneumatic tire 100 (e.g., radially offset from axis AX and disposed at a common peripheral spacing). As such, support plates 222 and/or 224, if included, together with non-pneumatic tire 100 can be positioned within mold cavity 214 and/or can be operatively engaged co-extensively with interstitial curing system 210. Support plates 222 and 224 also include an outer peripheral edge 230 that has, in a preferred arrangement, an outer cross-sectional dimension that is approximately equal to or less the outermost cross-sectional dimension of non-pneumatic tire 100 (e.g., diametrically across tread body 112). Additionally, in some cases, support plates 222 and 224 can, optionally, include an inner peripheral edge 232. Furthermore, in some cases, support plates 222 and 224 can, optionally, include an alignment ridge 234 dimensioned to operatively engage a portion of less-than-fully-cured non-pneumatic tire 100

(e.g., inner surface portion 122 of annular ring 106) such that alignment ridge 234 is axially coextensive with a portion of the non-pneumatic tire.

Figure 7:
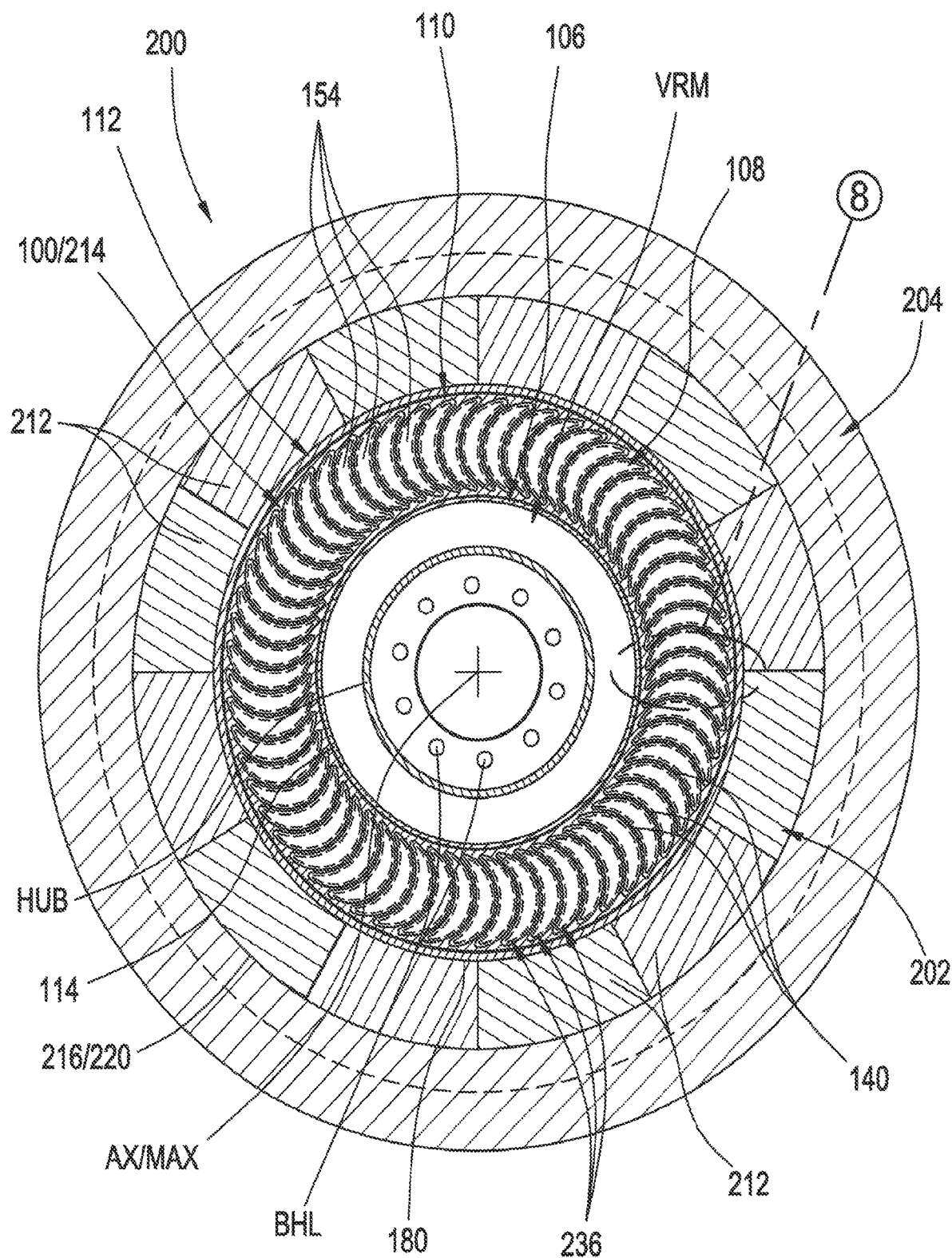
FIG. 7 is a cross-sectional top plan view of the mold assembly and exemplary less-than-fully-cured non-pneumatic tire in FIGS. 3-6 taken from along line 7-7 in FIG. 4.

As shown in FIGS. 5-11, interstitial curing system 210 includes a plurality of curing shoe assemblies 236, represented by dashed lines in FIG. 7, that are radially offset from mold axis MAX and arranged in peripherally-spaced relation to one another around the mold axis. In a preferred arrangement, curing shoe assemblies 236 are arranged such that one or more of the curing shoe assemblies is disposed within one of spaces 154 when less-than-fully-cured non-pneumatic tire 100 is positioned within mold cavity 214. In such an arrangement, curing shoe assemblies 236 can be selectively actuated and de-actuated (or otherwise released) such that the curing shoe assemblies correspondingly engage and disengage one or more walls and/or wall portions of structure body 108. In an engaged condition, the curing shoe assemblies can apply surface pressure and/or transfer heat into structure body 108, such as may operate to transition one or more walls and/or wall portions of the structure body that are formed from a less-than-fully-cured elastomeric material into a substantially-cured elastomeric material.

That is, in an actuated condition, curing shoe assemblies 236 can abuttingly engage and thereby apply pressure and/or transfer heat to inner layer 124 of structure body 108. In such an arrangement, the application of pressure by the curing shoe assemblies urges the inner layer toward annular ring 106. Additionally, or in the alternative, curing shoe assemblies 236 can, in an actuated condition, abuttingly engage and thereby apply pressure and/or transfer heat to outer layer 126 of structure body 108. In such an arrangement, the application of pressure by the curing shoe assemblies urges the outer layer toward annular ring 110. Furthermore, and/or as another alternative, curing shoe assemblies 236 can, in an actuated condition, abuttingly engage and thereby apply pressure and/or transfer heat to support structures 140 with adjacent curing shoe assemblies 236 applying pressure and/or transferring heat to the support structure disposed therebetween. In some cases, curing shoe assemblies 236 can apply pressure and/or heat on or along ends 146 and/or 148 of the support structure thereby ensuring ends 146 and/or 148 are in embedded engagement with inner and outer layers 124 and 126, respectively.

It will be appreciated that curing shoe assemblies in accordance with the subject matter of the present disclosure can be of any suitable type, kind and/or configuration, and can be operatively connected on and/or along mold section 202 and/or 204 in any suitable manner. In some cases, each of curing shoe assemblies 236 can be supported on or along mold section 202. In other cases, each of curing shoe assemblies 236 can be supported on or along mold section 204. In still other cases, one or more of curing shoe assemblies 236 can be supported on or along mold section 202 with the remainder of curing shoe assemblies 236 supported on or along mold section 204, such as in an alternating or interleaved arrangement, for example.

As one non-limiting example, interstitial curing system 210 can include a support plate 238 on or along which one or more of curing shoe assemblies 236 can be secured or otherwise supported. Additionally, interstitial curing system 210 can include a fluid-pressure transfer (or distribution) system 240 operatively associated with one or more of curing shoe assemblies 236 opposite support plate 238. In the exemplary arrangement shown in FIGS. 5-9, support plate 238 can be supported on or along mold section 202 and fluid-pressure transfer system 240 can be supported on or along mold section 204. In this manner, support plate 238 together with any one or more curing shoe assemblies 236 supported thereon and fluid-pressure transfer system 240 can be separated from one another in an open condition of mold assembly 200 to permit non-pneumatic tire 100 to be loaded and unloaded. Support plate 238 together with any one or more curing shoe assemblies 236 supported thereon and fluid-pressure transfer system 240 can then be moved into engagement with one another in a closed condition of mold assembly 200.

Figure 8:
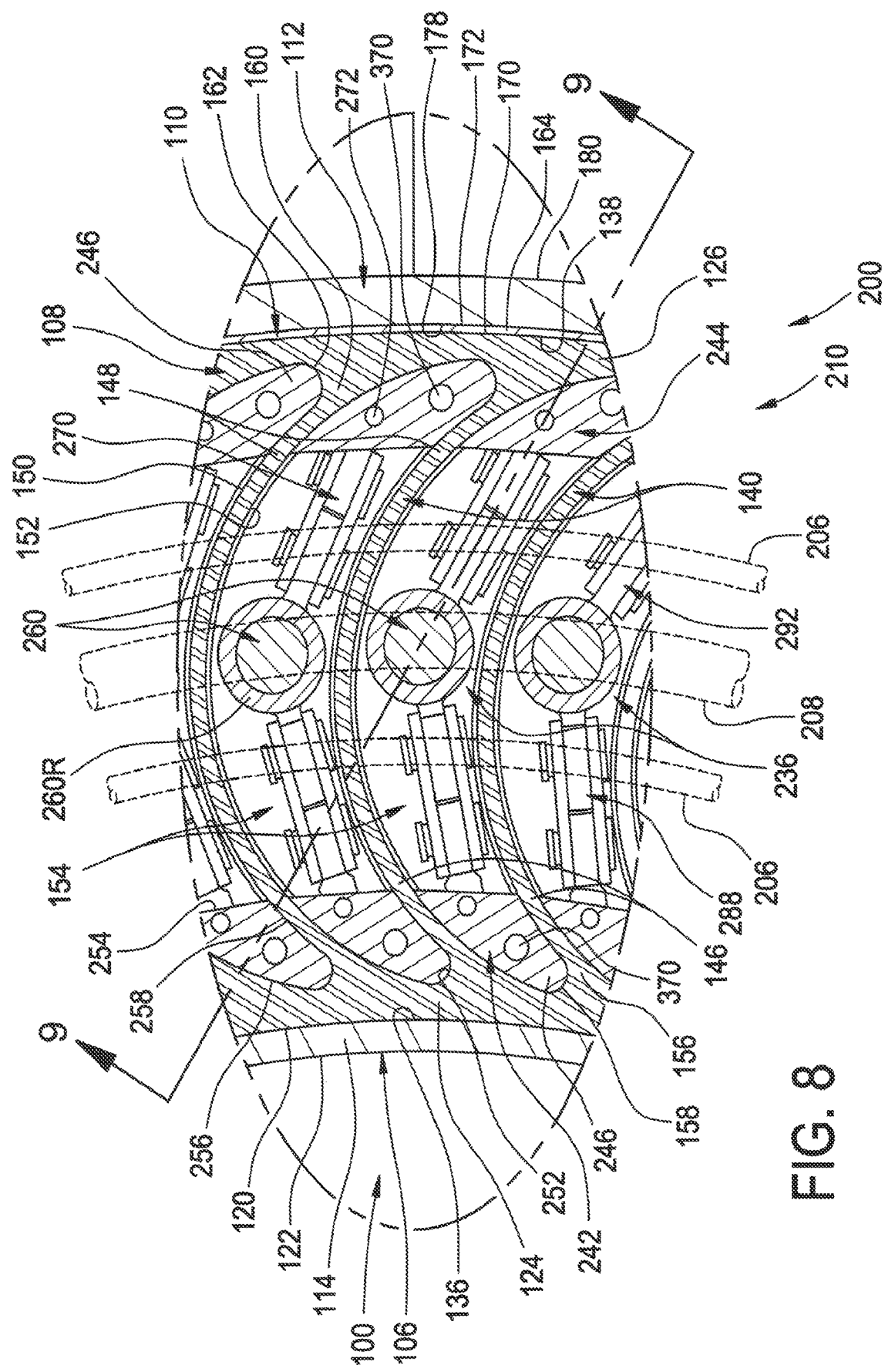
FIG. 8 is an enlarged view of the portion of the mold assembly and exemplary less-than-fully-cured non-pneumatic tire identified as Detail 8 in FIG. 7.
Figure 10:
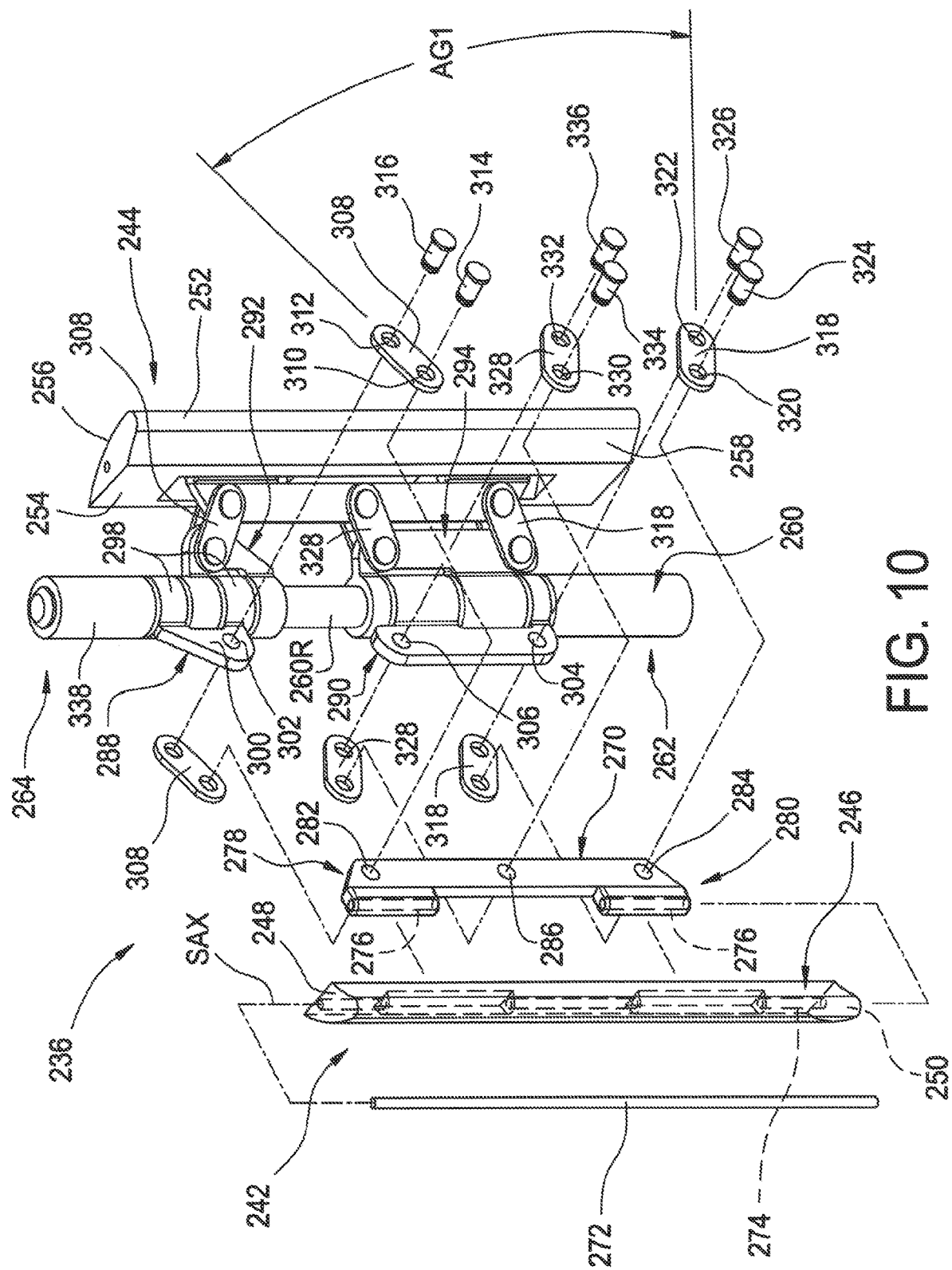
FIG. 10 is a partially-exploded top perspective view of an exemplary curing shoe assembly shown in FIGS. 5-9.
Figure 11:
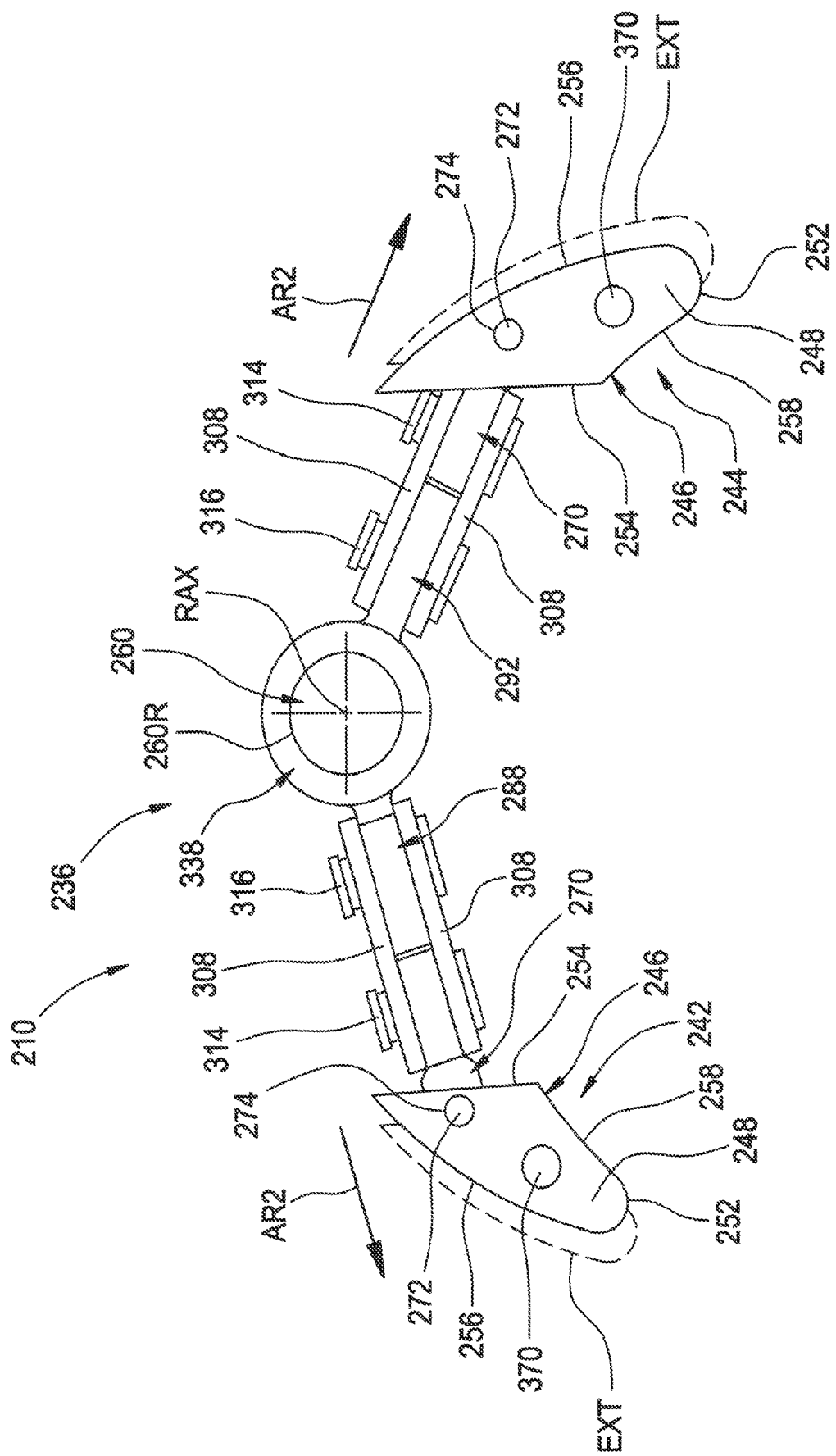
FIG. 11 is a top plan view of the exemplary curing shoe assembly shown in FIGS. 5-10.

Curing shoe assemblies 236 can include any suitable combination of components operable to actuate and de-actuate (or otherwise release or retract) the curing shoe assemblies during a manufacturing process in accordance with the subject matter of the present disclosure. For example, curing shoe assemblies 236 can include curing shoes 242 and 244 that are supported on or along support plate 238 for lateral displacement between a retracted position (i.e., a de-actuated condition), which is shown in FIGS. 10 and 11, and an extended position (i.e., an actuated condition), which is shown in FIG. 8 and represented by dashed lines EXT in FIG. 11. It will be recognized and appreciated that the retracted position (i.e., de-actuated condition) is suitable for loading and unloading of non-pneumatic tire 100 into and out of mold assembly 200, and that the extended position (i.e., actuated condition) is suitable for performing the subject manufacturing process of curing non-pneumatic tires. As such, it will be appreciated that curing shoes 242 and 244 can be supported on or along the support plate in any suitable orientation relative to one another, such as may corresponds to curable features of less-than-fully-cured non-pneumatic tire 100. In a preferred arrangement, curing shoes 242 and 244 are displaced in opposing directions such that the curing shoes generate fully or partially (e.g., acting at an obtuse included angle) counteracting forces (e.g., radially-inward pressure on layer 124 from curing shoe 242 and radially-outward pressure on layer 126 from curing shoe 244).

Curing shoes 242 and/or 244 can include any suitable number of walls, wall portions, surfaces and/or surface portions. In some cases, curing shoes 242 and 244 can be of different sizes, shapes and/or profiles such as may be complementary or otherwise at least partially correspond to features and/or characteristics of support structures 140 and/or other walls and/or wall portions of non-pneumatic tire 100, for example. As a non-limiting example, curing shoes 242 and 244 can include a shoe axis SAX disposed in offset alignment with mold axis MAX and a shoe body wall 246 that extends axially between an end surface portion 248 and an end surface portion 250. Shoe body wall 246 includes an outer edge surface portion 252 extending axially between end surface portions 248 and 250 that faces outward generally away from the opposing curing shoe. Outer edge surface portion 252 has a curved cross-sectional profile taken transverse to shoe axis SAX. In a preferred arrangement, outer edge surface portion 252 can have a profile or shape complementary or otherwise corresponding to end surface portion 158 of inner layer 124 and/or end surface portion 162 of outer layer 126 of structure body 108. An inner edge surface portion 254 extends axially between end surface portions 248 and 250 and faces inward toward the opposing curing shoe. Shoe body wall 246 also includes side surface portions 256 and 258 that extend axially between end surface portions 248 and 250 and extend laterally between outer edge surface portion 252 and inner edge surface portion 254. Side surface portions 256 and 258 have curved cross-sectional profiles taken transverse to shoe axis SAX with side surface portion 256 having a convex shape that can be complementary or otherwise correspond to concave surface portions 150 of support structures 140 and side surface portion 258 having a concave shape that can be complementary or otherwise correspond to convex surface portions 152 of support structures 140.

It will be appreciated that curing shoes 242 and 244 can be operatively supported on, along or otherwise between support plate 238 and fluid-pressure transfer system 240 in any suitable manner. As one non-limiting example, curing shoe assemblies 236 can include an actuation member 260 that has a member axis RAX (FIG. 10) disposed in offset alignment with mold axis MAX and extends axially from an end 262 disposed along support plate 238 toward an end 264 disposed in spaced relation to end 262 axially away from support plate 238. In a preferred arrangement, actuation member 260 can include one or more cylindrical rod portions 260R extending axially therealong that permit other components supported on or along the actuation member to rotate about member axis RAX. End 262 of actuation members 260 can be secured on or along support plate 238 in any suitable manner. As one non-limiting example, support plate 238 can include a plurality of holes or passages 266 into which end 262 of actuation members 260 can at least partially extend for securement of the actuation members on or along the support plate 238. End 264 of actuation members 260 can be dimensioned to cooperatively engage fluid-pressure transfer system 240 in a closed condition of mold assembly 200. As a non-limiting example, fluid-pressure transfer system 240 can include a plurality of holes or passages 268 into which end 264 of actuation members 260 can at least partially extend for providing axial and/or lateral support to the actuation members in a closed condition of the mold assembly as well as to provide other operational features, as discussed hereinafter.

Curing shoes 242 and 244 can be operatively connected on or along actuation members 260 in any manner suitable for displacing the curing shoes between extended and retracted positions respectively corresponding to actuated and de-actuated conditions of curing shoe assemblies 236. For example, curing shoe assemblies 236 can include shoe mounts 270 that are operatively connected to curing shoes 242 and 244, such as by way of a mounting rod 272 that extends axially through passages 274 in shoe body walls 246 and passages 276 in shoe mounts 270 to pivotally connect each shoe mount to a corresponding curing shoe. In some cases, shoe mounts 270 can extend lengthwise between opposing ends 278 and 280 with passages 276 extending lengthwise therebetween. In such an arrangement, the elongated configuration of the shoe mounts results in the pivotal connections between the curing shoe and the shoe mount being disposed in axially-spaced relation to one another, such as by one or more of mounting rods 272, which can assist in distributing extension forces acting on the shoe mount uniformly along surface portions 252, 256 and/or 258 of the curing shoe to aid in applying surface pressure approximately uniformly along the axial length of walls and/or wall portions of structure body 108.

It will be appreciated that extension and/or retraction forces can be transferred to curing shoes 242 and 244 through shoe mounts 270 in any suitable manner and/or by way of any suitable combination of components. As one non-limiting example, shoe mounts 270 can include one or more holes or passages extending therethrough in a direction transverse to shoe axis SAX. As a non-limiting example, shoe mount 270 can include a hole or passage 282 extending therethrough along end 278 and a hole or passage 284 extending therethrough along end 280. In some cases, shoe mount 270 can, optionally, include a hole or passage 286 extending therethrough that is positioned axially between passages 282 and 284.

Curing shoes 242 and 244 together with shoe mounts 270 that are secured thereto can be operatively connected on or along actuation member 260 in any suitable manner. For example, curing shoe assemblies 236 can include pivot yokes 288 and 290 supported on or along rod portion 260R of actuation member 260 and operatively connected to shoe mounts 270 that are secured to curing shoes 242. Additionally, curing shoe assemblies 236 can include pivot yokes 292 and 294 that are supported on or along rod portion 260R of actuation member 260 and operatively connected to shoe mounts 270 that are secured to curing shoes 244.

Though pivot yokes 288, 290, 292, and 294 are shown as having somewhat different geometrical shapes, the pivot yokes can, in some cases, have a substantially similar configuration of walls and/or wall portions. For example, pivot yokes 288-294 can include a yoke wall 296 that includes sleeve wall portions 298 and a flange wall portion 300 that extends radially outward from the sleeve wall portions. In some cases, sleeve wall portions 298 can be spaced axially from one another with flange wall portion 300 operatively connecting the sleeve wall portions such that a space (not numbered) is included between the axially-spaced sleeve wall portions. In such cases, pivot yokes 288 and 292 can, optionally, be axially interengaged with one another and/or pivot yokes 290 and 294 can, optionally, be axially interengaged with one another. In any case, sleeve wall portions 298 at least partially define a passage (not numbered) through yoke wall 296 that is dimensioned to extend along rod portion 260R of actuation member 260 such that pivot yokes 288-294 can pivot or otherwise rotate relative to the actuation member and relative to one another around member axis RAX. One or more holes or passages oriented transverse to member axis RAX can extend through flange wall portions of pivot yokes 288-294. For example, pivot yokes 288 and 292 are shown as including a hole or passage 302 extending through the flange wall portions thereof. Whereas, pivot yokes 290 and 294 are shown as including a plurality of holes or passages 304 and 306 extending through the flange wall portions thereof. It will be appreciated, however, that other configurations and/or arrangements could alternately be used.

Pivot yokes 288 and 290 are supported separately from one another on or along rod portion 260R of the actuation member. As such, pivot yokes 288 and 290 can be axially displaced toward and away from one another on or along the rod portion. Similarly, pivot yokes 292 and 294 are supported separately from one another on or along rod portion 260R of the actuation member. As such, pivot yokes 292 and 294 can be axially displaced toward and away from one another on or along the rod portion. In cases in which pivot yokes 288 and 292 are interengaged with one another and/or pivot yokes 290 and 294 are interengaged with one another, such as has been discussed above, it will be appreciated that pivot yokes 288 and 292 will move together axially and/or pivot yokes 290 and 294 will move together axially, such as during actuation and/or de-actuation of the curing shoe assemblies.

Shoe mounts 270 can be pivotally connected to flange wall portions 300 of pivot yokes 288-294 in any suitable manner, such as by way of one or more linkage members pivotally attached therebetween. For example, curing shoe assemblies 236 can include linkage members 308 that pivotally interconnect flange wall portions 300 of pivot yokes 288 and 292 with corresponding shoe mounts 270. Linkage members 308 can include holes or passages 310 and 312 extending therethrough that are respectively disposed in approximate alignment with holes 282 and 302 such that pivot pins 314 and 316 can extend respectively therethrough to operatively connect the linkage members between the flange wall portion and corresponding shoe mount. As another example, curing shoe assemblies 236 can include linkage members 318 that pivotally interconnect flange wall portions 300 of pivot yokes 290 and 294 with corresponding shoe mounts 270. Linkage members 318 can include holes or passages 320 and 322 extending therethrough that are respectively disposed in approximate alignment with holes 284 and 304 such that pivot pins 324 and 326 can extend respectively therethrough to operatively connect the linkage members between the flange wall portion and corresponding shoe mount. As a further example, curing shoe assemblies 236 can, optionally, include linkage members 328 that pivotally interconnect land wall portions 300 of pivot yokes 290 and 294 with corresponding shoe mounts 270. Linkage members 328 can include holes or passages 330 and 332 extending therethrough that are respectively disposed in approximate alignment with holes 286 and 306 such that pivot pins 334 and 336 can extend respectively therethrough to operatively connect the linkage members between the flange wall portion and corresponding shoe mount. In some cases, two or more linkage members can be used, such as along opposing sides of the shoe mounts and corresponding flange wall portions, to provide additional strength and/or stability to the pivot connections. It will be appreciated, however, that such a construction is merely exemplary and that other configurations and/or arrangements could alternately be used without departing from the subject matter of the present disclosure.

Curing shoe assemblies 236 include an actuation member 338 supported for axial displacement relative to actuation member 260 such that as actuation members 260 and 338 are moved relative to one another in a first axial direction (e.g., toward one another), pivot yokes 288/292 and 290/294 are moved in the first axial direction relative to one another (e.g., toward one another). Such displacement is operative to transition curing shoes 242 and 244 to, from and/or otherwise between actuated and de-actuated conditions. It will be appreciated that the configuration and arrangement of at least linkage members 308 and 318 relative to one another can control whether the curing shoes expand outwardly during movement of actuation members 260 and 338 toward or away from one another. For example, in the arrangement shown and described herein, linkage members 308 and 318 are disposed at an acute included angle relative to one another, as represented in FIG. 10 by angular dimension AG1. In such an arrangement, holes 312 and 322 are spaced apart a greater distance from one another than holes 310 and 312 in a de-actuated condition of curing shoe assemblies 236. As such, as actuation members 260 and 338 are displaced toward one another, linkage members 308 and 318 counter-rotate relative to one another forcing curing shoes 242 and 244 radially outward. As actuation members 260 and 338 are displaced away from one another, the curing shoes are drawn toward one another by the relative rotation of the linkage members.

As discussed above, curing shoe assemblies 236 can be actuated and/or de-actuated by way of any suitable combination of one or more force applicators. For example, mold assembly 200 and/or interstitial curing system 210 thereof can be communicatively coupled with pressurized fluid source PFS, for example. In such case, pressurized fluid (e.g., air, steam, water, oil) from pressurized fluid source PFS can apply, balance and/or otherwise control the application of forces to curing shoe assemblies as the same are selectively displaced between extended and retracted positions, such as may respectively correspond to actuated and de-actuated conditions of the curing shoe assemblies.

It will be appreciated that forces applied, balances and/or otherwise controlled by pressurized fluid source PFS can be selectively applied, balanced and/or otherwise transferred to and/or from curing shoe assemblies 236 in any suitable manner. In one exemplary arrangement, actuation member 338 can include an inner surface portion that is at least approximately cylindrical such that the actuation member can be coaxially and coextensively displaced (e.g., telescopically) on or along rod portion 260R of actuation member 260. Mold assembly 200 and/or interstitial curing system 210 can include fluid-pressure distribution system 240 that is in fluid communication with pressurized fluid source PFS through conduits 206 and operatively associated with actuation members 338 of curing shoe assemblies 236. Fluid-pressure distribution system 240 can include a base plate 342 that can be supported on or along mold section 204. Fluid-pressure distribution system 240 also includes an inner side wall 344 and an outer side wall 346 that are supported on base plate 342 with the outer side wall spaced radially outward of the inner side wall. An end wall 348 is supported on inner and outer side walls 344 and 346 such that a fluid chamber 350 is at least partially defined therebetween. Fluid chamber 350 can be disposed in fluid communication with pressurized fluid source in any suitable manner, such as by way of conduits 206, for example.

Fluid-pressure distribution system 240 also includes plurality of piston assemblies 352 that are supported in peripherally spaced relation to one another along end wall 348. Piston assemblies 352 extend between a piston head portion 354 and a piston end portion 356. Piston assemblies 352 are supported on end wall 348 such that piston head portion 354 is disposed in fluid communication with fluid chamber 350 with piston end portion 356 extending through the end wall and out of fluid chamber 350. Piston end portions 356 can be operatively engaged with one or more actuation members 338 of curing shoe assemblies in any suitable manner. As one non-limiting example, curing shoe assemblies 236 can include an actuator cap body 358 that is operatively connected to one or more of piston assemblies 352, and can include holes or passages 268 into which end 264 of actuation members 260 and/or actuation members 338 can extend or be otherwise operatively engaged. In such an arrangement, an approximately uniform and/or otherwise balanced fluid pressure is applied to substantially all of piston assemblies 352, which transfer an approximately common and uniform actuation force to substantially all of actuator cap bodies 358 and substantially all of actuation members 338.

Figure 9:
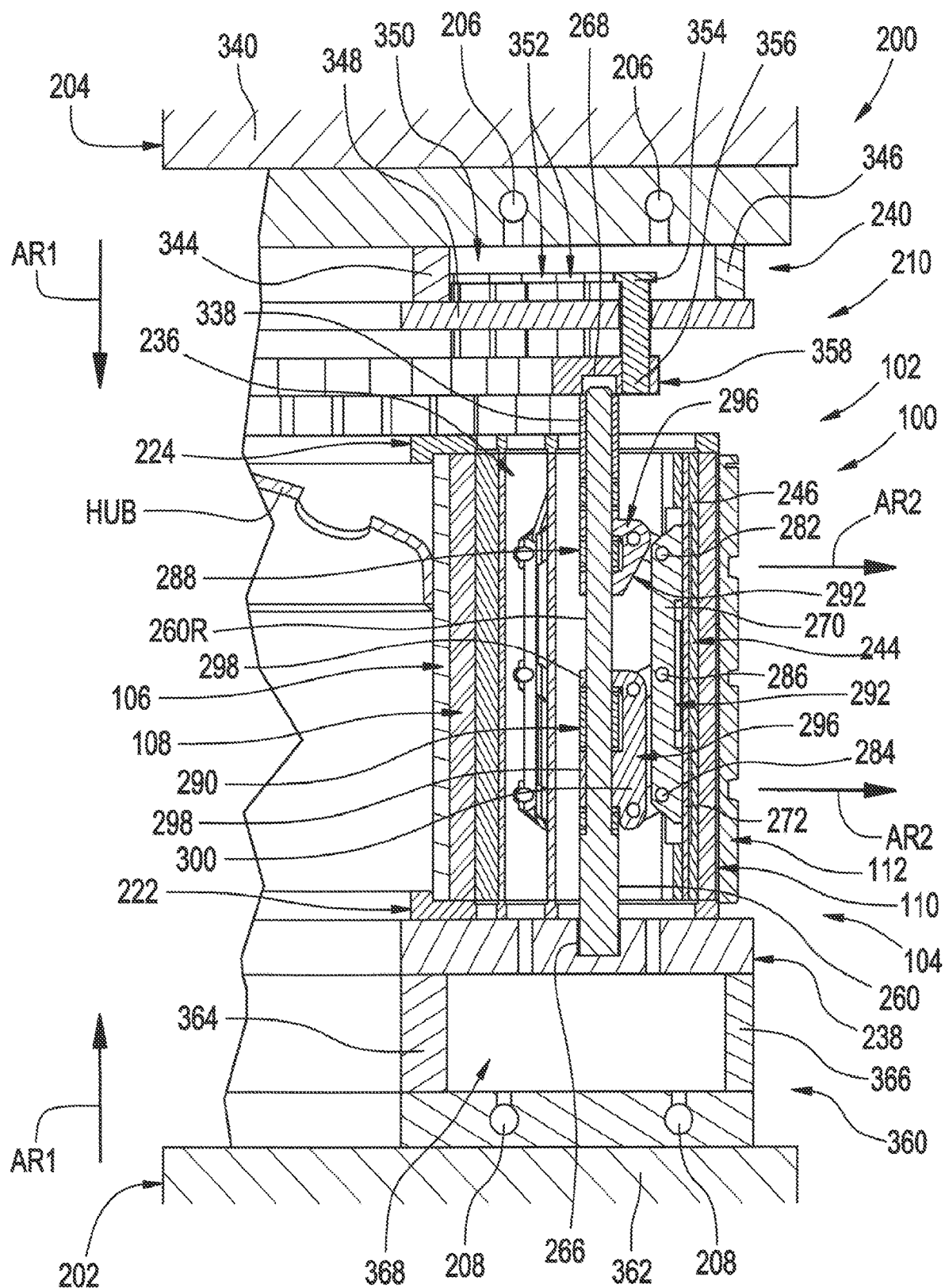
FIG. 9 is a cross-sectional side view of the mold assembly and exemplary less-than-fully-cured non-pneumatic tire in FIGS. 1-8 taken from along line 9-9 in FIG. 8.

During use and operation, as mold sections 202 and 204 are moved toward one another, actuator cap bodies 358 operatively engage actuation members 338 to displace the actuation members and pivot yokes 288-294 toward one another along member axis RAX, such as is represented in FIG. 9 by arrows AR1. Such displacement of pivot yokes 288 and 292 toward pivot yokes 290 and 294 causes displacement of curing shoes 242 and 244 in an outward direction and/or otherwise toward an extended position, as is represented in FIGS. 9 and 11 by arrows AR2. As actuation members 260 and 338 together with pivot yokes 288-294 are displaced away from one another along member axis RAX, curing shoe assemblies 236 are de-actuated and curing shoes 242 and/or 244 can return to a retracted position, such as by way of springs or other biasing members operatively connected with the pivot yokes and/or shoe mounts, for example.

As pressure is applied to less-than-fully-cured non-pneumatic tire 100 by curing shoe assemblies 236, a method in accordance with the subject matter of the present can also include applying heat to the less-than-fully-cured non-pneumatic tire. It will be appreciated that heat can be transferred into less-than-fully-cured non-pneumatic tire 100 in any suitable manner and/or through any suitable combination of heat transfer mechanisms and/or processes. As one example, mold assembly 200 can be communicatively coupled with heated fluid source HFS. In such case, heated fluid (e.g., air, steam, water) can be circulated into any suitable combination of passages and/or chambers of mold assembly 200. For example, mold assembly 200 and/or interstitial curing system 210 can include a heated-fluid distribution system 360 fluidically connected to heated fluid source HFS.

Heated-fluid distribution system 360 can include a base plate 362 that can be supported on or along mold section 202. Heated-fluid distribution system 360 can also include an inner side wall 364 and an outer side wall 366 that are supported on base plate 362 with the outer side wall spaced radially outward of the inner side wall. Support wall 238 can be supported on or along inner and/or outer side walls 364 and 366 to at least partially define a heated-fluid chamber 368. In such an arrangement, heated fluid can be transferred into and out of spaces 154 of structure body 108 through passages 370 of support plate 238, such as by way of conduits 208, for example. In some cases, shoe body wall 246 of curing shoes 242 and/or 244 can include heat-transfer passages 370 extending therethrough that can be disposed in fluid communication with heated-fluid distribution system 360.

Figure 12:
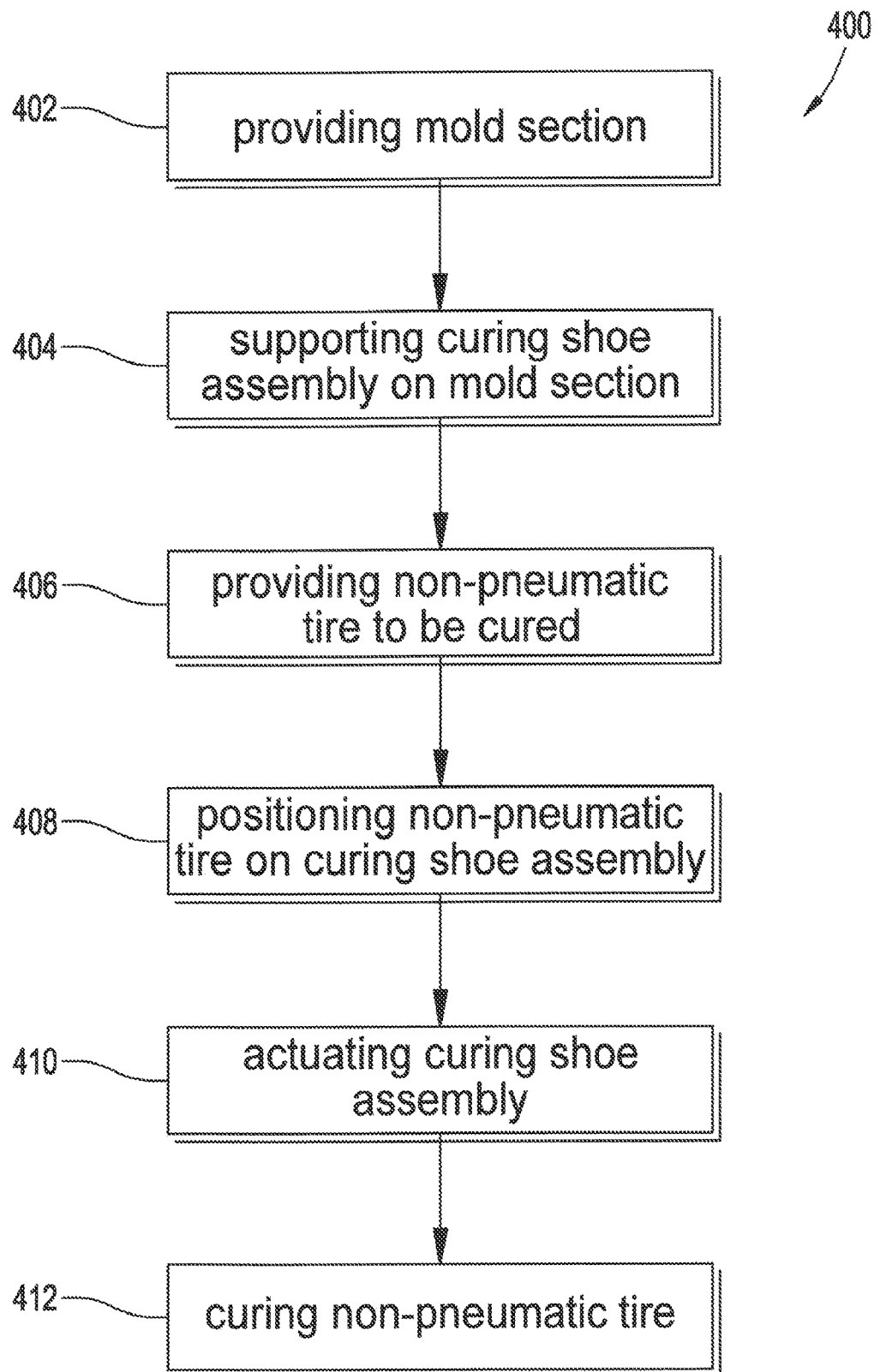
FIG. 12 is a graphical representation of one example of a method of manufacture in accordance with the subject matter of the present disclosure.

A method 400 of manufacturing in accordance with the subject matter of the present disclosure of manufacturing a non-pneumatic tire is shown in FIG. 12 can include providing a mold section having mold axis MAX, such as one of mold sections 202 and 204, for example, as is represented in FIG. 12 by reference number 402. Method 400 can also include supporting one or more curing shoe assemblies, such as curing shoe assemblies 236, for example, on the mold section in radially-offset relation to mold axis MAX, such as is represented in FIG. 12 by reference number 404. In a preferred arrangement, a plurality of curing shoe assemblies 236 will be disposed in spaced relation to one another about mold axis MAX to at least partially form interstitial curing system 210. Method 400 can further include providing less-than-fully-cured non-pneumatic tire 100 and positioning the less-than-fully-cured non-pneumatic tire on or along the mold section in an axially coextensive arrangement with the one or more curing bladder assemblies, such as is represented in FIG. 12 by reference numbers 406 and 408, respectively. Method 400 can also include actuating the one or more curing shoe assemblies and then curing the non-pneumatic tire, such as is represented in FIG. 12 by reference numbers 410 and 412, respectively.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus, it is to be distinctly understood claims directed to any such combination of features and/or components, whether or not specifically embodied herein, are intended to find support in the present disclosure. To aid the Patent Office and any readers of this application and any resulting patent in interpreting the claims appended hereto, Applicant does not intend any of the appended claims or any claim elements to invoke 35 U.S.C. 112(f) unless the words "means for" or "step for" are explicitly used in the particular claim.

While the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A method of manufacturing a non-pneumatic tire, said method comprising:

supporting a curing shoe assembly on a first mold section that has a longitudinal-extending mold axis with said curing shoe assembly including:
 a first actuation member supported on said first mold section such that said first actuation member is disposed in radially-offset alignment with said mold axis;
 a second actuation member supported in coaxial relation to said first actuation member for axial displacement relative thereto;
 a first curing shoe spaced laterally from said first and second actuation members; and,
 a second curing shoe spaced laterally from said first and second actuation members in a direction opposite said first curing shoe; and,
 pivotally connecting a first first linkage member between said first actuation member and said first curing shoe and pivotally connecting a first second linkage member between said second actuation member and said first curing shoe such that said first and second curing shoes are operatively connected to said first and second actuation members such that movement of said first and second actuation members relative to one another in a first axial direction displaces said first and second curing shoes laterally away from one another and movement of said first and second actuation members relative to one another in a second axial direction opposite said first axial direction displaces said first and second curing shoes laterally toward one another;
providing a less-than-fully-cured non-pneumatic tire assembly that includes a plurality of support structures disposed in peripherally-spaced relation to one another and a plurality of spaces disposed in peripherally-spaced relation to one another with one of said plurality of spaces between adjacent ones of said plurality of support structures;
positioning said less-than-fully-cured non-pneumatic tire assembly along said first mold section such that said curing shoe assembly is disposed within one of said plurality of spaces and axially coextensive with said less-than-fully-cured non-pneumatic tire assembly;
displacing said first and second actuation members relative to one another in said first axial direction includes rotating said first first linkage member in a first rotational direction relative to said first curing shoe and rotating said first second linkage member in a second rotational direction opposite said first rotational direction of said first first linkage member and thereby displacing said first and second curing shoes away laterally away from one another into engagement with and applying pressure to said less-than-fully-cured non-pneumatic tire assembly; and,
curing said non-pneumatic tire assembly.

2. A method according to claim 1, wherein:
supporting said curing shoe assembly on said first mold section includes pivotally connecting a second first linkage member between said first actuation member and said second curing shoe and pivotally connecting a second second linkage member between said second actuation member and said second curing shoe; and,
displacing said first and second actuation members relative to one another in said first axial direction includes rotating said second first linkage member in a first rotational direction relative to said second curing shoe and rotating said second second linkage member in a second rotational direction opposite said first rotational direction of said second first linkage member.

3. A mold assembly for curing non-pneumatic tires, said mold assembly comprising:
 a first mold section having a longitudinally-extending mold axis;
 a curing shoe assembly supported on said first mold section, said curing shoe assembly including:
  a first actuation member supported on said first mold section such that said first actuation member is disposed in radially-offset alignment with said mold axis;
  a second actuation member supported in coaxial relation to said first actuation member and for axial displacement relative thereto;
  a first curing shoe spaced laterally from said first and second actuation members; and,
  a second curing shoe spaced laterally from said first and second actuation members in a direction opposite said first curing shoe;
  said first and second curing shoes operatively connected to said first and second actuation members such that movement of said first and second actuation members relative to one another in a first axial direction displaces said first and second curing shoes laterally away from one another and movement of said first and second actuation members relative to one another in a second axial direction opposite said first axial direction displaces said first and second curing shoes laterally toward one another.

4. A mold assembly according to claim 3, wherein said curing shoe assembly includes:
 a first first linkage member pivotally connected between said first actuation member and said first curing shoe;
 a first second linkage member pivotally connected between said second actuation member and said first curing shoe;
 a second first linkage member pivotally connected between said first actuation member and said second curing shoe; and,
 a second second linkage member pivotally connected between said second actuation member and said second curing shoe.

5. A mold assembly according to claim 3, wherein said first actuation member includes a first cylindrical surface portion and said second actuation member includes a second cylindrical surface portion with said first and second actuation members telescopically engaged with one another such that said first and second cylindrical surface portions are axially coextensive with one another.

6. A mold assembly according to claim 3 further comprising a second mold section displaceable relative to said first mold section, said second mold section including a chamber containing a quantity of pressurized fluid.

7. A mold assembly according to claim 6, wherein said second mold section includes a piston in fluid communication with said quantity of pressurized fluid, said piston dimensioned to operatively engage said second actuation member.

8. A method of manufacturing a non-pneumatic tire, said method comprising:
 supporting a curing shoe assembly on a first mold section that has a longitudinal-extending mold axis with said curing shoe assembly including:

a first actuation member supported on said first mold section such that said first actuation member is disposed in radially-offset alignment with said mold axis;

a second actuation member supported in coaxial relation to said first actuation member for axial displacement relative thereto;

a first curing shoe spaced laterally from said first and second actuation members; and, a second curing shoe spaced laterally from said first and second actuation members in a direction opposite said first curing shoe with said first and second curing shoes operatively connected to said first and second actuation members such that movement of said first and second actuation members relative to one another in a first axial direction displaces said first and second curing shoes laterally away from one another and movement of said first and second actuation members relative to one another in a second axial direction opposite said first axial direction displaces said first and second curing shoes laterally toward one another;

providing a less-than-fully-cured non-pneumatic tire assembly that includes a plurality of support structures disposed in peripherally-spaced relation to one another and a plurality of spaces disposed in peripherally-spaced relation to one another with one of said plurality of spaces between adjacent ones of said plurality of support structures;

positioning said less-than-fully-cured non-pneumatic tire assembly along said first mold section such that said curing shoe assembly is disposed within one of said plurality of spaces and axially coextensive with said less-than-fully-cured non-pneumatic tire assembly;

displacing said first and second actuation members relative to one another in said first axial direction thereby displacing said first and second curing shoes away laterally away from one another into engagement with and applying pressure to said less-than-fully-cured non-pneumatic tire assembly; and, curing said non-pneumatic tire assembly.

9. A method according to claim 8 further comprising displacing said first and second actuation members relative one another in said second axial direction thereby drawing said first and second curing shoes laterally toward one another, and removing said non-pneumatic tire assembly from along said curing shoe assembly.

10. A method according to claim 8, wherein curing said non-pneumatic tire assembly includes introducing a heated fluid into said one of said plurality of spaces within which said curing shoe assembly is positioned.

11. A method according to claim 8, wherein said first actuation member includes a first cylindrical surface portion and said second actuation member includes a second cylindrical surface portion with said first and second actuation members telescopically engaged with one another such that said first and second cylindrical surface portions are axially coextensive with one another, and displacing said first and second actuation members in said first axial direction includes telescopically translating said first and second actuation members relative to one another.

12. A method according to claim 8, wherein displacing said first and second actuation members in said first axial direction includes operatively engaging a second mold section with said second actuation member and displacing one of said first and second mold sections toward the other of said first and second mold sections.

13. A method according to claim 8, wherein said curing shoe assembly is one of a plurality of curing shoe assemblies disposed in peripherally-spaced relation to one another about said mold axis, and positioning said less-than-fully-cured non-pneumatic tire assembly along said first mold section includes positioning each of said plurality of spaces around a different one of said plurality of curing shoe assemblies.

14. A method according to claim 12, wherein said second mold section includes a chamber containing a quantity of pressurized fluid, and operatively engaging said second mold section with said second actuation member includes applying force to said second actuation member through said quantity of pressurized fluid.

15. A method according to claim 14, wherein said second mold section includes a piston in fluid communication with said quantity of pressurized fluid, and applying force to said second actuation member includes operatively engaging said piston with said second actuation member.

16. A method according to claim 8, wherein providing said less-than-fully-cured non-pneumatic tire assembly includes:

providing a first annular ring having a longitudinal axis, said first annular ring extending axially between a first first ring end and a second first ring end spaced axially from said first first ring end, said first annular ring including a first ring outer surface portion facing radially outward and disposed between said first first ring end and said second first ring end; and, applying a first layer of less-than-fully-cured elastomeric material along at least said first ring outer surface portion of said first annular ring.

17. A method according to claim 16, wherein providing said less-than-fully-cured non-pneumatic tire assembly includes:

providing a second annular ring extending axially between a first second ring end and a second second ring end spaced axially from said first second ring end, said second annular ring including a second ring inner surface portion facing radially inward and disposed between said first second ring end and said second second ring end; and, applying a second layer of less-than-fully-cured elastomeric material along at least said second ring inner surface portion of said second annular ring.

18. A method according to claim 17, wherein providing said less-than-fully-cured non-pneumatic tire assembly includes positioning said second annular ring concentrically and coextensively with said first annular ring.

19. A method according to claim 18, wherein providing said less-than-fully-cured non-pneumatic tire assembly includes providing a plurality of support structures with each of said plurality of support structures including a first support structure edge, a second support structure edge opposite said first support structure edge, a first support structure end and a second support structure end opposite said first support structure end.

20. A method according to claim 19, wherein providing said less-than-fully-cured non-pneumatic tire assembly includes positioning said plurality of support structures in peripherally-spaced relation to one another about said longitudinal axis of said first annular ring such that said first support structure end of said plurality of support structures are spaced apart from one another along said first layer of less-than-fully-cured elastomeric material and such that said second support structure ends of said plurality of support structures are spaced apart from one another along said second layer of less-than-fully-cured elastomeric material.

\* \* \* \* \*